US012633134B2

(12) United States Patent
Hizako

(10) Patent No.: US 12,633,134 B2
(45) Date of Patent: May 19, 2026

(54) RECOGNITION APPARATUS, RECOGNITION METHOD, AND STORAGE MEDIUM

(71) Applicant: CANON KABUSHIKI KAISHA, Tokyo (JP)

(72) Inventor: Ken Hizako, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 18/477,634

(22) Filed: Sep. 29, 2023

(65) Prior Publication Data

US 2024/0127602 A1 Apr. 18, 2024

(30) Foreign Application Priority Data

Oct. 17, 2022 (JP) ................................. 2022-166444

(51) Int. Cl.
| | |
|---|---|
| *G06V 20/58* | (2022.01) |
| *G06T 3/4053* | (2024.01) |
| *G06V 10/12* | (2022.01) |
| *G06V 10/22* | (2022.01) |
| *G06V 20/40* | (2022.01) |

(52) U.S. Cl.
CPC .......... *G06V 20/582* (2022.01); *G06T 3/4053* (2013.01); *G06V 10/12* (2022.01); *G06V 10/22* (2022.01); *G06V 20/41* (2022.01)

(58) Field of Classification Search
CPC ...... G06V 20/582; G06V 10/12; G06V 10/22; G06V 20/41; G06T 3/4053
See application file for complete search history.

(56) References Cited

U.S. PATENT DOCUMENTS

| | | | |
|---|---|---|---|
| 9,697,430 B2 | 7/2017 | Kristensen | |
| 2005/0226508 A1* | 10/2005 | Gotohda | ................ G06V 40/10 |
| | | | 382/209 |
| 2010/0189183 A1* | 7/2010 | Gu | ................... H04N 21/23439 |
| | | | 375/E7.154 |
| 2017/0017849 A1* | 1/2017 | Kristensen | ............. G06V 20/63 |
| 2021/0192231 A1* | 6/2021 | Lee | ...................... G05D 1/0231 |
| 2021/0266458 A1* | 8/2021 | Nayak | ................... H04N 23/69 |

FOREIGN PATENT DOCUMENTS

JP          2016-538665 A        12/2016

* cited by examiner

*Primary Examiner* — Wassim Mahrouka
(74) *Attorney, Agent, or Firm* — Venable LLP

(57) ABSTRACT

A recognition apparatus including: a detection unit configured to detect a subject to be recognized from a first image that has been captured by an image capturing apparatus; a determining unit configured to, in a case in which the subject has been detected from the first image, determine a region including at least a portion of the subject in the first image; a control unit configured to control the image capturing apparatus so as to generate a second image that corresponds to the region; an image processing unit configured to generate a third image by processing to increase a resolution of the second images; and a recognition unit configured to recognize contents that are indicated by the subject from the third image.

9 Claims, 7 Drawing Sheets

P1

RECOGNITION APPARATUS, RECOGNITION METHOD, AND STORAGE MEDIUM

BACKGROUND OF THE INVENTION

Field of the Invention

The present invention relates to a recognition apparatus, a recognition method, a storage medium, and the like.

Description of Related Art

At present, level 3 autonomous driving of automobiles, which are one type of movable apparatuses, on highways has been achieved. Level 3 autonomous driving refers to the system that is mounted on an automobile executing all of the operations necessary for driving such as steering, deceleration, acceleration, and the like when under predetermined conditions.

In addition, it is expected that level 4 autonomous driving of automobiles on freeways will be achieved in the near future. Level 4 autonomous driving refers to the continuous execution of all operations necessary for driving by a system that is mounted on an automobile.

In order to achieve the above-described autonomous driving, it is necessary for an automobile to be equipped with an image capturing apparatus that fulfills the role of the eyes of the operator. Such an image capturing apparatus must be able to not only recognize objects that are present on the road such as other automobiles and the like, but also be able to recognize the contents that are indicated on road signs, road information boards, road guidance boards, and the like with high precision.

Published Japanese Translation No. 2016-538665 of the PCT International Publication discloses a recognition method for traffic signs, and discloses that unclearness due to movements in a particular image region is calculated, this image region is made clear, and the traffic signs are recognized by referring to the image region that has been made clear.

However, in a case in which the resolution of an image that has been captured by an image capturing apparatus has been increased with the goal of recognizing road signs and the like with a high precision, the data amount becomes high, and smooth transmission becomes difficult.

SUMMARY OF THE INVENTION

In order to solve the problem that has been described above, the recognition apparatus according to one aspect of the present invention comprises at least one processor or circuit configured to function as: a detection unit configured to detect a subject to be recognized from a first image that has been captured by an image capturing apparatus; a determining unit configured to, in a case in which the subject has been detected from the first image, determine a region including at least a portion of the subject in the first image; a control unit configured to control the image capturing apparatus such that a second image that corresponds to the region is generated; an image processing unit configured to generate a third image by processing to increase a resolution of the second image; and a recognition unit configured to recognize contents that are indicated by the subject from the third image.

Further features of the present invention will become apparent from the following description of embodiments with reference to the attached drawings.

DETAILED DESCRIPTION OF THE INVENTION

Hereinafter, with reference to the accompanying drawings, favorable modes of the present invention will be described using Embodiments. In each diagram, the same reference signs are applied to the same members or elements, and duplicate descriptions will be omitted or simplified.

Figure 1:
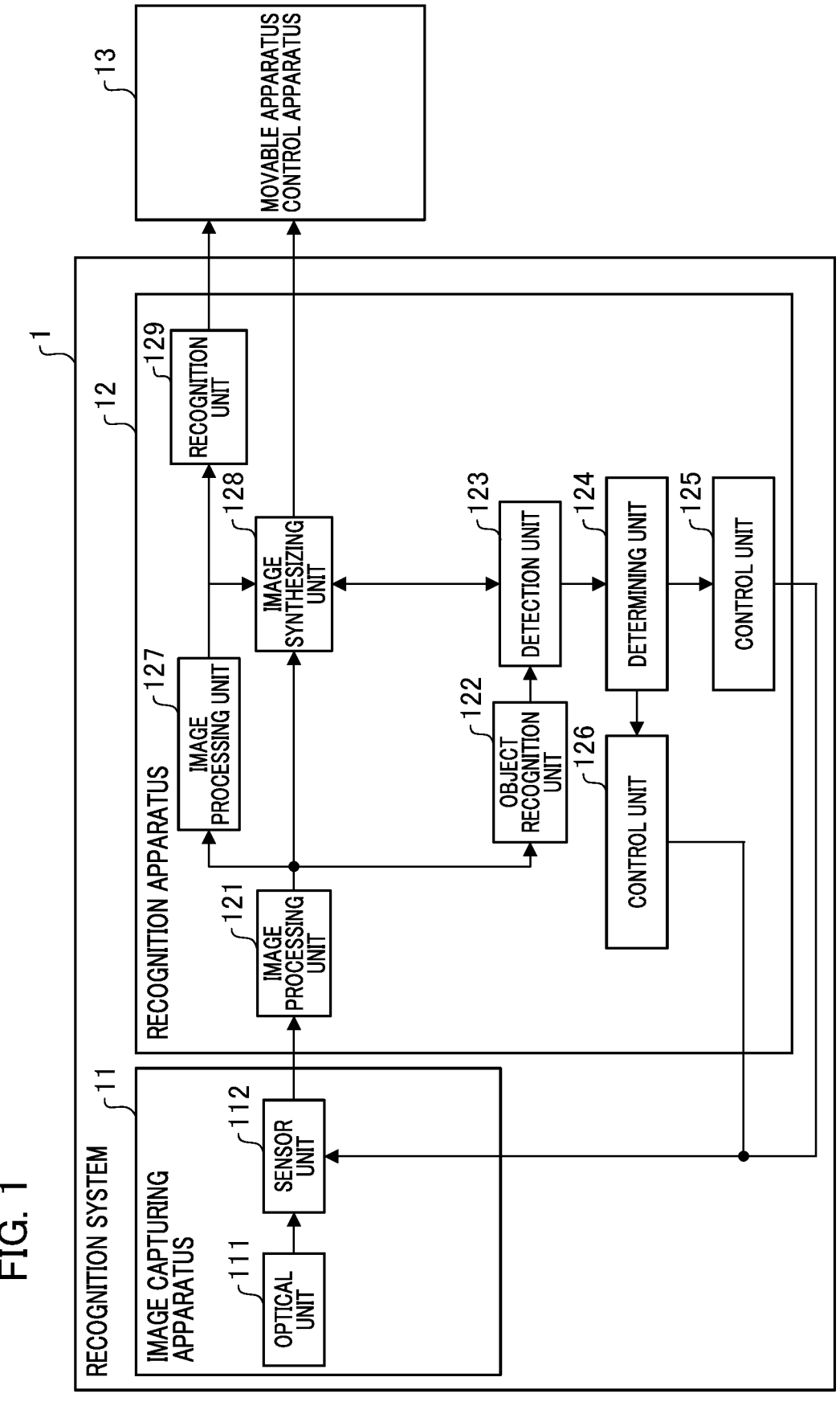
FIG. 1 is a diagram showing an example of a recognition system according to an Embodiment.

Below, an Embodiment of the present invention will be explained with reference to FIG. 1 to FIG. 7. FIG. 1 is a diagram showing an example of a recognition system according to the Embodiment. As is shown in FIG. 1, a recognition system 1 is provided with an image capturing apparatus 11, and a recognition apparatus 12.

The image capturing apparatus 11 is, for example, a camera that is mounted in an arbitrary position on a movable apparatus such as an automobile or the like. The image capturing apparatus 11 is provided with, for example, as is shown in FIG. 1, an optical unit 111, and a sensor unit 112.

The optical unit 111 is an optical system that is mounted on the image capturing apparatus 11, is provided with lenses, mirrors, and the like, and optically forms a subject image on the sensor unit 112. The sensor unit 112 is provided with a micro-lens, a color filter, a light receiving element, and the like. In addition, the light receiving element is, for example, a photodiode.

The sensor unit 112 converts the optical subject image that has been formed by the optical unit 111 into an electric signal, and transmits this to the recognition apparatus 12. This electric signal includes a plurality of first images that forms a first movie image. Note that in the present embodiment generating an electrical image signal by converting the optical subject image formed by the optical unit 111 is called capturing an image.

Figure 2:
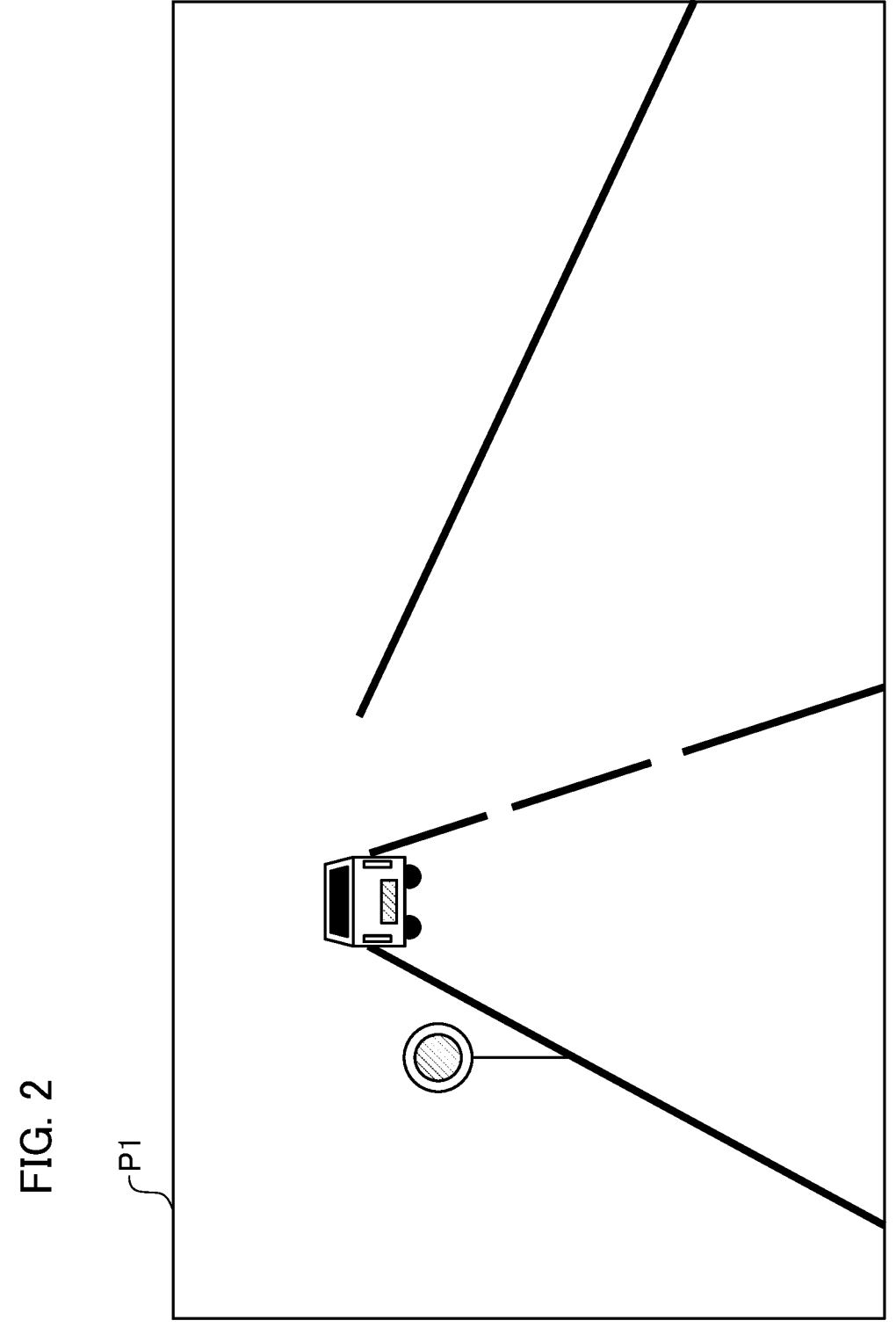
FIG. 2 is a diagram showing an example of a first image configuring a first movie image according to the Embodiment.

FIG. 2 is a diagram showing an example of a first image that forms a first movie image according to the Embodiment. FIG. 2 shows a first image P1 that configures a first movie image. As is shown in FIG. 2, the first image P1 shows the road on which the vehicle on which the image capturing apparatus 11 is mounted is travelling, road signs that are placed by this road, and automobiles that are travelling in front of this vehicle.

In addition, the first image P1 is an image corresponding to the largest range that can be captured by the image capturing apparatus 11 has been captured. However, the first image may also be an image that was captured within a range that is smaller than the largest range that can be captured by the image capturing apparatus 11. The sensor unit 112, for example, transmits an electric signal showing the first image that is shown in FIG. 2 to the recognition apparatus 12.

In addition, the sensor unit 112 should have sufficient number of pixels such that processing to recognize regions in which there is an object to be detected such as a movable apparatus such as an automobile or the like, a road sign, a road information board, a road guidance board, or the like can be executed without any problems.

Such number is, for example, 2 million. However, the sensor unit 112 may also have a pixel number of an extent such that the processing by the recognition apparatus 12 to recognize the contents that are shown on an automobile registration number plate attached to an automobile, a road sign, a road information board, a road guidance board, or the like can be executed without any problems. Such a pixel number may be, for example, 12 million pixels. Note that in Japan, an automobile registration number plate is generally called as a "number plate".

As is shown in FIG. 1, the recognition apparatus 12 is provided with, for example, an image processing unit 121, an object recognition unit 122, a detection unit 123, a determining unit 124, a control unit 125, a control unit 126, an image processing unit 127, an image synthesizing unit 128, and a recognition unit 129.

In addition, the recognition apparatus 12 is also provided with a ROM (Read Only Memory), a CPU (Central Processing Unit), and a RAM (Random Access Memory). The ROM stores programs that realize each of the image processing unit 121, the object recognition unit 122, the detection unit 123, the determining unit 124, the control unit 125, the control unit 126, the image processing unit 127, the image synthesizing unit 128, and the recognition unit 129. The CPU reads out and opens these programs on the RAM, and executes each program.

The image processing unit 121 receives the electrical signal showing the first image from the sensor unit 112, and executes image processing on the first image. This image processing is, for example, de-mosaic processing, wide dynamic range (WDR) correction processing, gamma correction processing, Look Up Table (LUT) correction processing, distortion correction processing, or dodging processing.

After this processing has been executed, the first image is transmitted to the object recognition unit 122, the image processing unit 127, and the image synthesizing unit 128. In addition, the first image is stored on a storage medium after this processing has been executed. The storage medium referred to in this context is, for example, a semi-conductor storage element such as a DRAM (Dynamic Random Access Memory), or the like, and is able to read and write data.

The object recognition unit 122 executes processing that recognizes a region in which there is an object to be detected from the first image after image processing has been executed. In addition, the object recognition unit 122 executes this processing using, for example, Artificial Intelligence (AI) including machine learning.

Machine learning that is referenced in this context is, for example, deep learning or YOLO (You Only Look Once). In particular, YOLO is able to rapidly recognize a region in the image in which there is an object to be recognized by using a neural network, and is therefore useful. The object recognition unit 122 transmits data showing the first image on which image processing has been executed, and data showing the results of this processing to the detection unit 123. In addition, the object recognition unit 122 stores these data on the above-described storage medium.

The detection unit 123 detects subjects to be recognized from the first image that has been captured by the image capturing apparatus 11. For example, the detection unit 123 identifies subjects from the plurality of first images that configure the first movie image. In addition, for example, the detection unit 123 executes this detection by using artificial intelligence, and stores data showing the detection results on the above-described storage medium.

Furthermore, this data may also include not only the detection results, but also at least one of the type of subject, or the position or the orientation of the subject in the first image, and the like. In addition, the subject to be recognized that is referred to in this context, is for example, an object that indicates information necessary in order to autonomously move a movable apparatus such as an automobile or the like using at least one of written characters, numerals, symbols, or graphics, and can be arbitrarily set.

Figure 3:
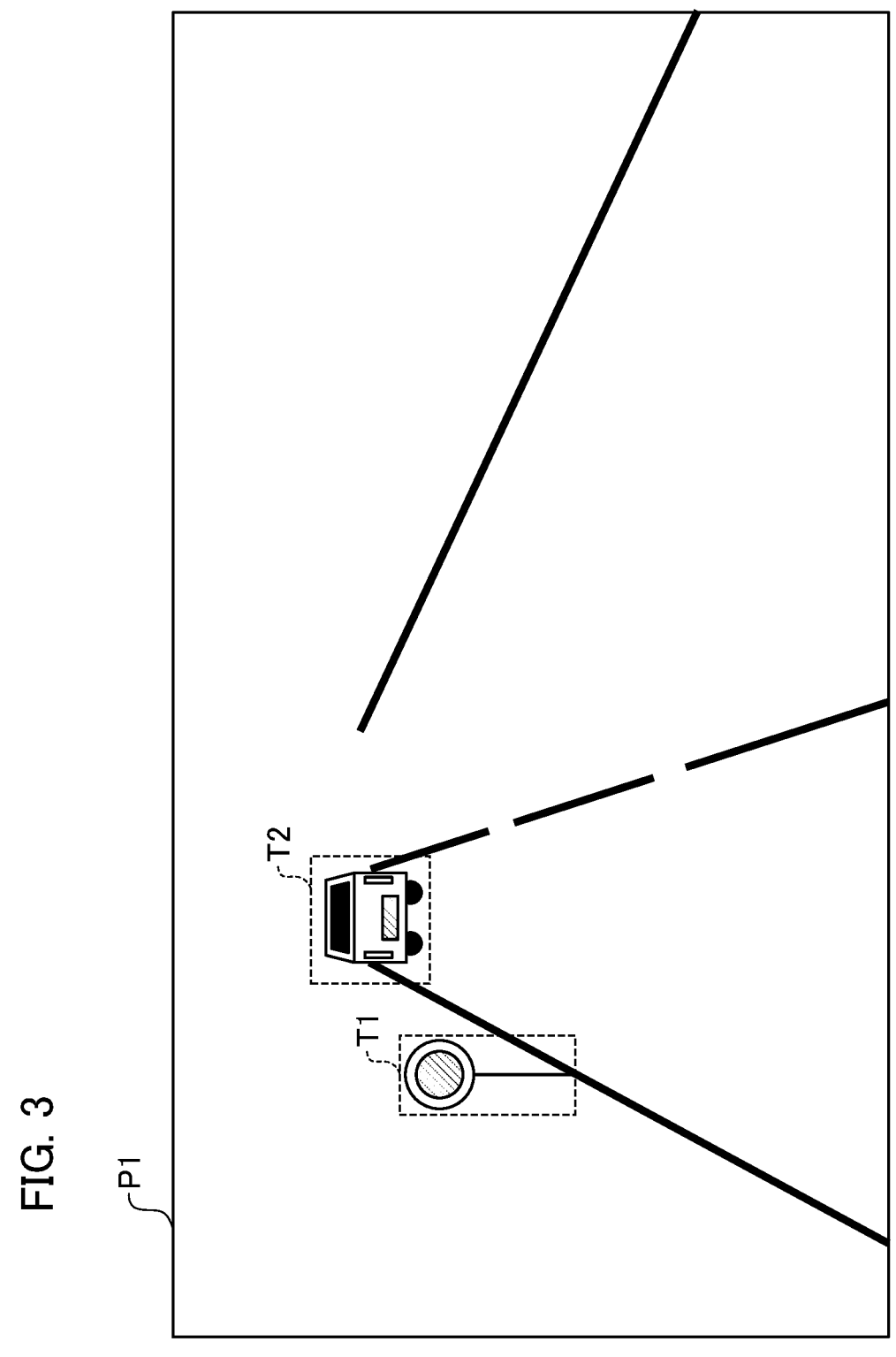
FIG. 3 is a diagram showing an example of a subject to be recognized by the recognition apparatus according to the Embodiment.

FIG. 3 is a diagram showing an example of a subject to be recognized by the recognition apparatus according to the Embodiment. For example, the detection unit 123 determines that a road sign T1 and an automobile T2 that are shown in FIG. 3 are subjects to be recognized, and that these subjects are detected from the first image P1.

The determining unit 124 determines a region that includes at least a portion of the subject in the first image in a case in which a subject has been detected from the first image. In addition, in a case in which it has been identified that the subject is shown in the plurality of first images, the determining unit 124 determines the region such that this is the same range in the plurality of first images.

Furthermore, the determining unit 124 preferably determines this region such that all of the subjects to be recognized are included, and the area of this region becomes as small as possible. This is because it is necessary to avoid a situation in which the contents that are indicated by the subject to be recognized are failed to be recognized, while reducing data amount for a third image and a third movie image that will be described below.

Figure 4:
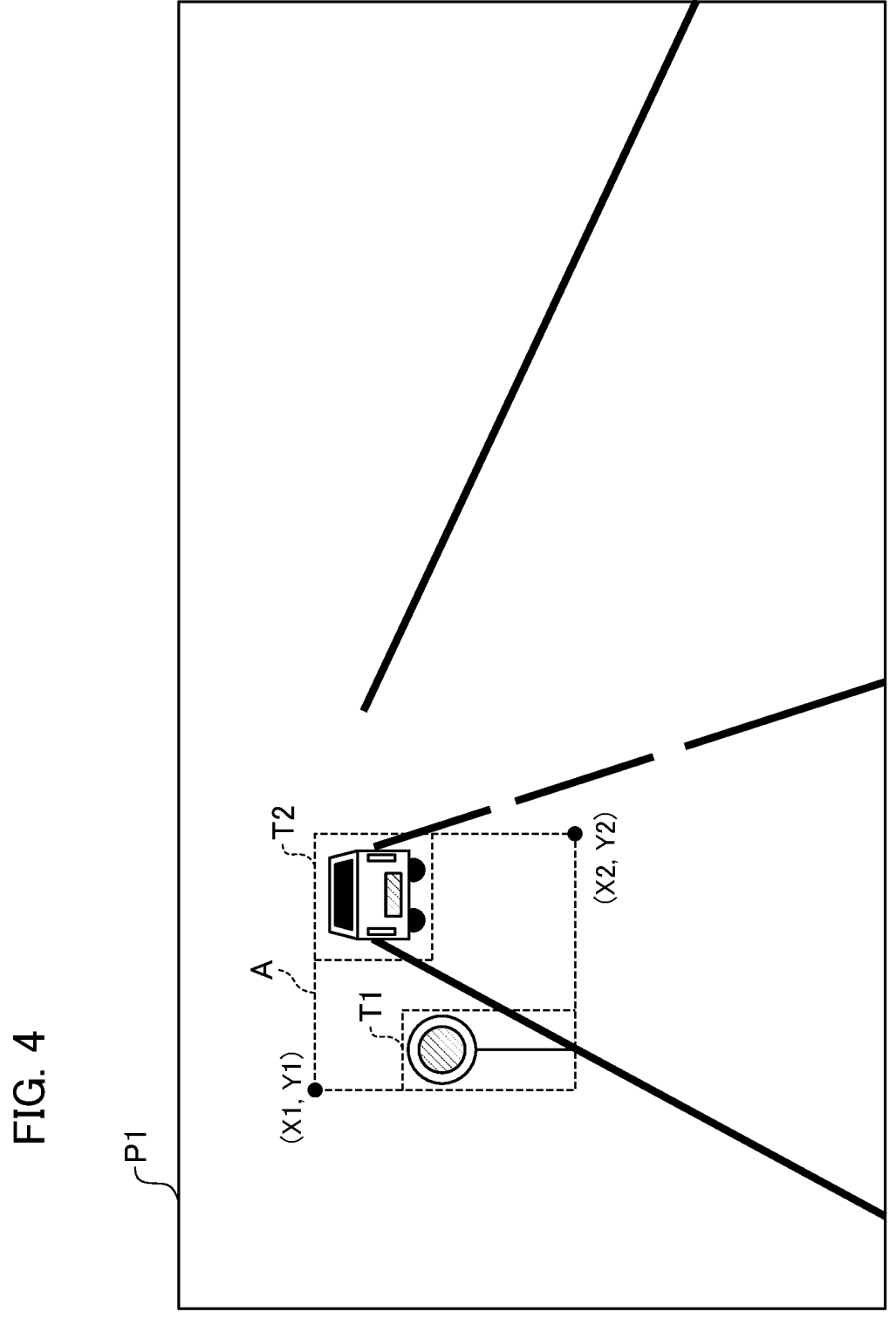
FIG. 4 is a diagram showing an example of a region that has been determined by the recognition apparatus according to the Embodiment.

FIG. 4 is a diagram showing an example of a region that has been determined by the recognition apparatus according to the embodiment. For example, the determining unit 124 determines a rectangular region A that includes the road sign T1 and the automobile T2 that are the subjects to be recognized in the first image P1. As is shown in FIG. 4, in the region A, the coordinates for the upper left vertex in the first image P1 are (X1, Y1), and the coordinates for the lower right vertex are (X2, Y2).

The control unit 125 controls the image capturing apparatus 11 so as to generate a second image corresponding to the region that has determined by the determining unit 124. For example, the control unit 125 controls the image capturing apparatus 11 so as to capture the second movie image consisting of a plurality of second images corresponding to the region that has been determined by the determining unit 124.

Figure 5:
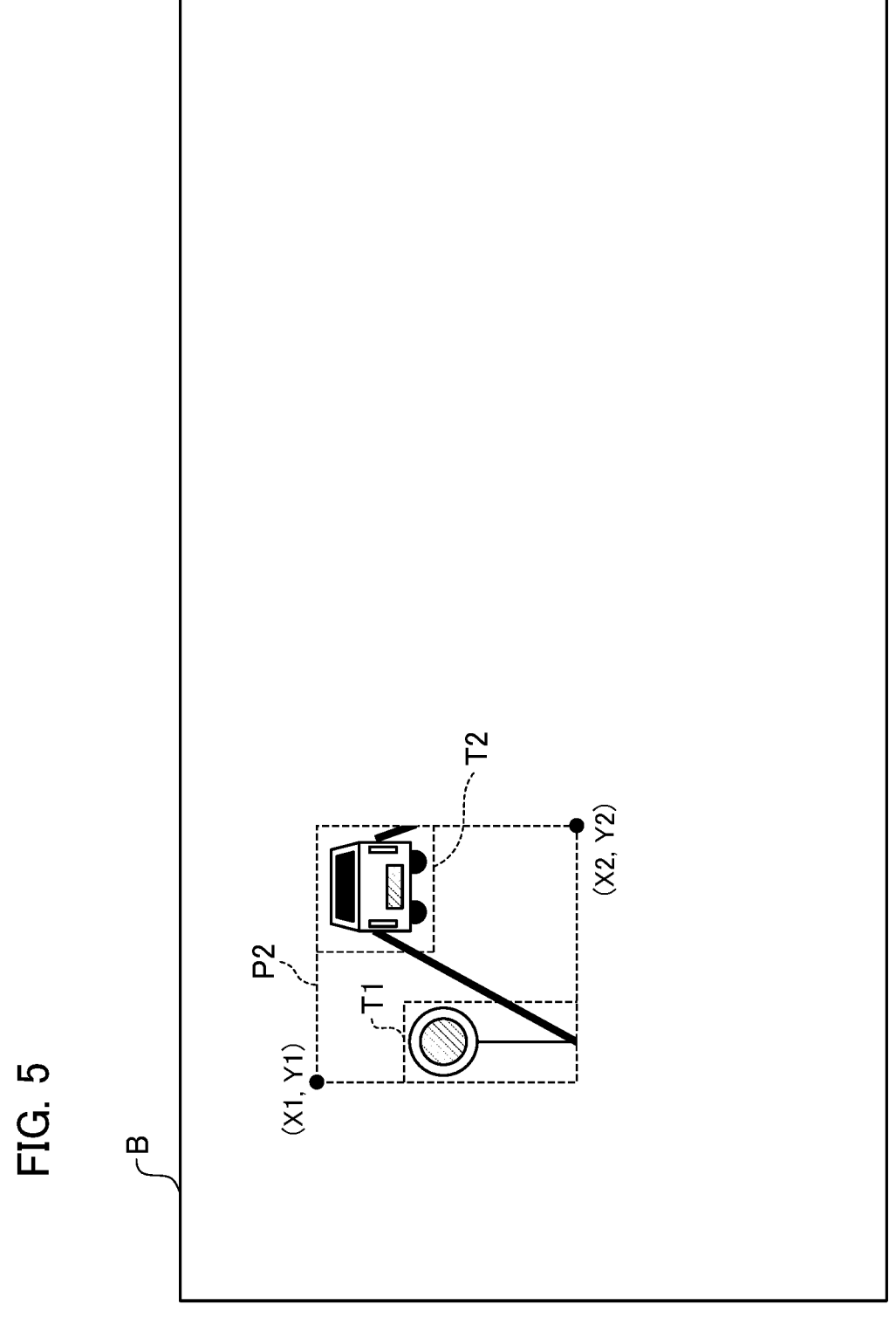
FIG. 5 is a diagram showing an example of a second image that configures a second movie image according to the Embodiment.

FIG. 5 is a diagram showing an example of a second image that corresponding to the second movie image according to the embodiment. In a case in which the first image P1 has been captured, the control unit 125 controls the image capturing apparatus 11 so as to capture the second image P2 such that corresponds to only the region A.

In other words, in a case in which the first image P1 has been captured, the control unit 125 controls the image capturing apparatus 11 so as to capture a second movie image consisting of a plurality of second images including the second image P2.

In addition, the second image P2 has the same position, orientation, and shape as the region A that was shown in FIG. 4, and the coordinates for the upper left vertex thereof are (X1, Y1), and the coordinates for the lower right vertex are (X2, Y2). In addition, the pixel number for the second image P2 is, for example, 2 million pixels. Note that the rectangle B shown in FIG. 5 is a rectangle that has the same position, orientation, and shape as the first image P1 that was shown in FIG. 2 to FIG. 4.

The determining unit 124 and the control unit 125 make it possible to suppress the data amounts for the third image and the third movie image, which will be described below, by executing the above-described processing.

Figure 6:
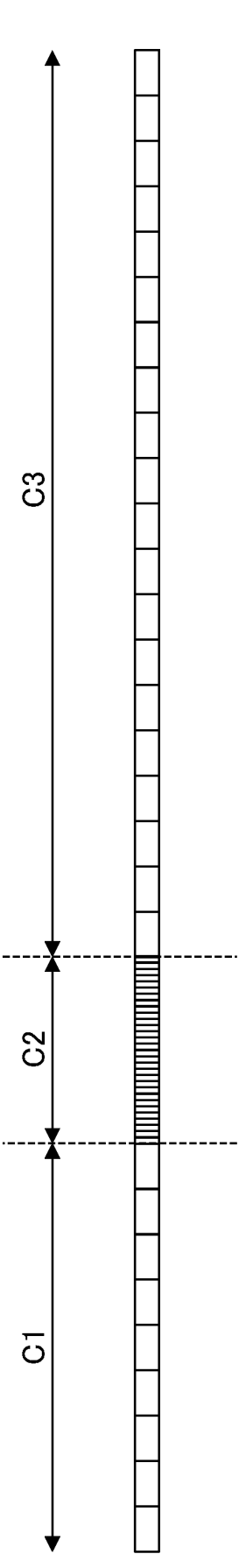
FIG. 6 is a diagram showing an example of a frame rate for the first movie image and a frame rate for the second movie image according to the Embodiment.

The control unit 126 controls the image capturing apparatus 11 so as to increase the number per unit of time of the plurality of second images that forms the second movie image. FIG. 6 is a diagram showing an example of a frame rate for the first movie image and a frame rate for the second movie image according to the embodiment.

FIG. 6 shows a time period C1, a time period C2, and a time period C3, during which the second movie image is captured by the image capturing apparatus 11. The control unit 126, for example, controls the image capturing apparatus 11 so as to switch from a frame rate for the second movie image of 30 fps (frames per second) to 300 fps at the point in time when the time period C1 has elapsed and the time period C2 begins, as is shown in FIG. 6.

In addition, after this, for example, the control unit 126 controls the image capturing apparatus 11 such that it switches from a framerate for the second movie image of 300 fps to 30 fps at the point in time when the time period C2 has elapsed and the time period C3 begins, as is shown in FIG. 6.

In addition, the control unit 126 may also control the image capturing apparatus 11 so as to increase the number per unit of time of second images that forms the second movie image according to a resolution that has been set by a processing to increase the resolution of each of the second images that forms the second movie image.

The image processing unit 127 generates a third image by processing to increase the resolution of a second image. Conversely, the image processing unit 127 generates a third movie image consisting of a plurality of third images by generating a plurality of third images by applying processing to increase the resolution of each of the plurality of second images that forms the second movie image.

In addition, the image processing unit 127 can also execute this processing on either of a second image in which the frame rate is controlled by the control unit 126, or a second image in which the frame rate is not controlled by the control unit 126. Note that at least one of the third image or the third movie image may also be displayed on a suitable monitor display to be used for any arbitrary purpose.

In addition, the image processing unit 127 may also generate a third image by applying super resolution processing to the plurality of second images. Super resolution processing is a technology that performs feedback to super resolution images that have been estimated by a super resolution image until the difference between each of a plurality of real images and a plurality of estimated images is converged, and increases the resolution of an image in which a subject has been captured.

The plurality of real images is generated by image capturing of the same subject performed by an image capturing apparatus, and these are images in which the positions of the subject in each of the images are deviated from one another. The estimated images are images that have been generated by applying the results of a simulation of a decrease in quality that occurs during the process of the image capturing of the subject by the image capturing apparatus to a super resolution image.

In a case in which a second movie image is captured that is configured by a plurality of second images, these second images show the same subject to be recognized, and the positions of this subject in the second images are deviated from one another, and therefore, these become the plurality of real images that was described above.

In addition, in a case in which the number per unit of time of second images that configure the second movie image has been increased by the control unit 126, these second images often become a further optimal plurality of real images. This is because the deviations between the positions of the same subject to be recognized within the second images often become smaller.

Therefore, super resolution technology is the preferable processing for when the image processing unit 127 generates the third image. Note that the image processing unit 127 may also use a technology other than a super resolution technology in order to generate the third image by increasing the resolution of the second image.

The image processing unit 127 generates the third image or the third movie image by executing the above-described processing, and it thereby becomes possible for the recognition unit 129 to recognize the contents that are indicated by the subject with a high degree of precision.

The image synthesizing unit 128 synthesizes the above described third image and the first image that is stored on the above-described storage medium, and transmits a movie image with a normal frame rate in which only the resolution for the region that was determined by the determining unit 124 has been increased to a movable apparatus control system 13.

The movable apparatus control unit 13 is, for example, an electronic control unit (ECU). The movable apparatus control unit 13 is able to integrally control the movable apparatus, to control the movable apparatus by using data and the like that have been received from the recognition apparatus 12, and to perform appropriate output to an external monitor.

The recognition unit 129 recognizes the contents that are indicated by the subject from the third image. In other words, the recognition unit 129 recognizes the contents that are indicated on a subject that is shown in the third movie image. In addition, the recognition unit 129 recognizes at least one of written characters, numerals, symbols, or graphics that are indicated by the subject.

Furthermore, the recognition unit 129 may also recognize the coordinates of at least one of the written characters, numerals, symbols, or graphics that are indicated by the subject. In addition, the recognition unit 129 transmits data showing the recognition results to the movable apparatus control unit 13.

Figure 7:
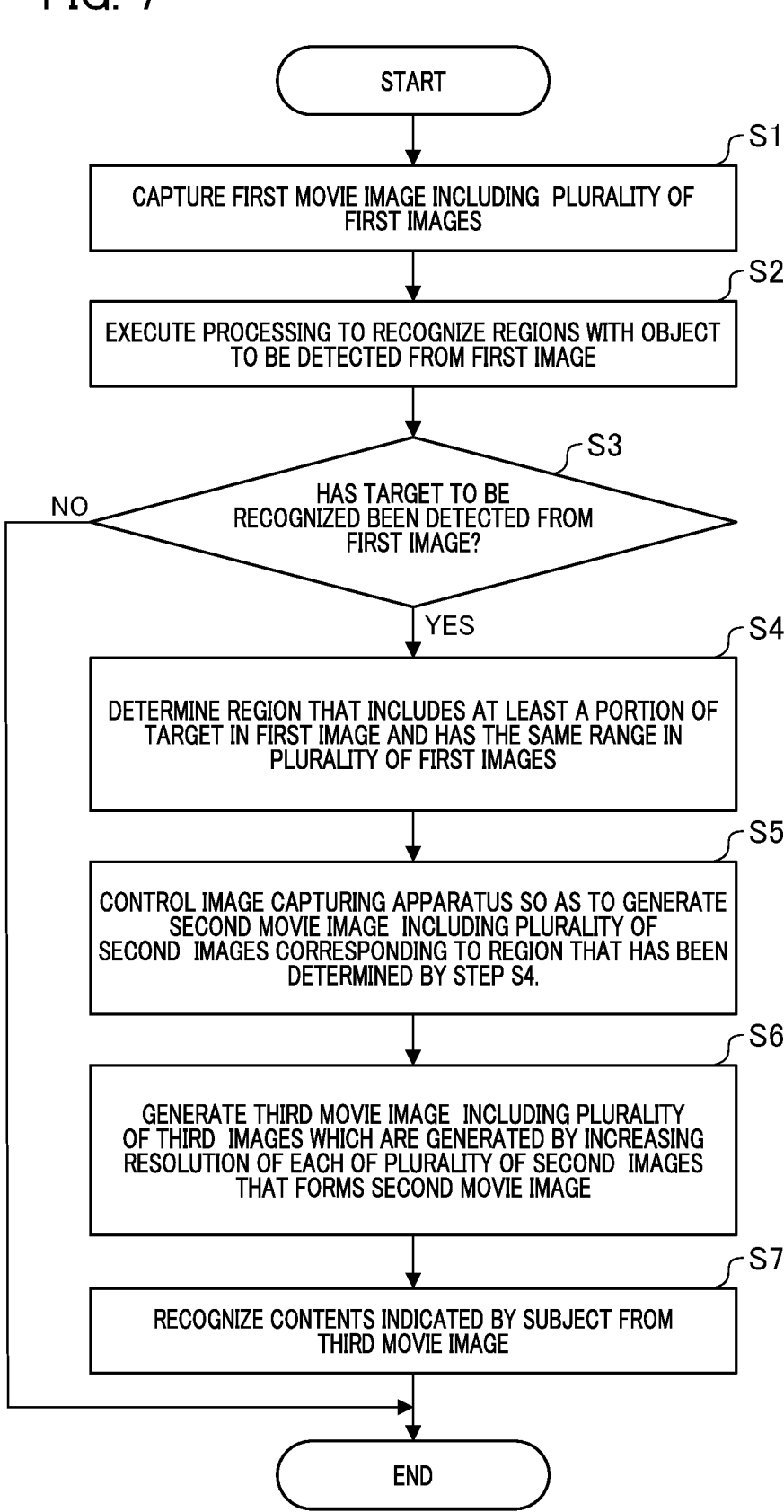
FIG. 7 is a flowchart showing an example of processing that is executed by the recognition system according to the Embodiment.

Next, the processing that is executed by the recognition system 1 will be explained while referencing FIG. 7. FIG. 7 is a flowchart showing processing that is executed by the recognition system according to the Embodiment.

In step S1, the image capturing apparatus 11 captures the first movie image including the plurality of first images.

In step S2, the object recognition unit 122 executes processing to recognize regions in which there is an object to be detected from the first image.

In step S3, the detection unit 123 identifies whether or not a subject to be recognized has been detected from the first image. In a case in which the detection unit has identified that a subject to be recognized has been detected in the first image (step S3: YES), the processing proceeds to step S4. In contrast, in a case in which the detection unit 123 has identified that a subject to be recognized has not been detected in the first image (step S3: NO), the processing shown in FIG. 7 is ended.

In step S4, the determining unit 124 determines a region that includes at least a portion of the subject in the first image, and which has the same region in the plurality of first images.

In step S5, the control unit 125 controls the image capturing apparatus 11 so as to generate a second movie image including the plurality of second images corresponding to the region that has been determined in step S4.

In step S6, the image processing unit 127 generates a third movie image including the plurality of third images which are generating by performing processing to increase the resolution of each of the plurality of second images forming the second movie image.

In step S7, the recognition unit 129 recognizes the contents that are indicated by the subject from the third movie image, then the processing shown in FIG. 7 is ended.

As explained in the above, the recognition apparatus 12 according to the embodiment is able to recognize the contents that are indicated by the subject at a high precision while suppressing the amount of data for the images by executing the above-described processing. In addition, it is possible for the recognition apparatus 12 to suppress the data amount for the images and the pixel number for the sensor unit 112, and therefore, it is also possible to reduce the cost of the hardware that is necessary to transmit the images, and the cost of the sensor unit 112.

Note that in the embodiment that has been described above, an example has been explained of a case in which the image capturing apparatus 11 is mounted on an automobile, which is one example of a movable apparatus. However, the present invention is not limited thereto. For example, the image capturing apparatus 11 may also be a camera that is mounted in an arbitrary position near a path such as a road or the like on which movable apparatuses move.

In addition, in the above-described embodiment, an example has been explained in which each function of the recognition apparatus 12 is realized by reading out and expanding a program that is stored on the ROM onto the RAM, an executing each of these programs. However, the present invention is not limited thereto.

Each function of the recognition apparatus 12 may also be realized by using, for example, an FPGA (Field-Programmable Gate Array) or an ASIC (Application Specific Integrated Circuit) instead of the ROM, CPU, and RAM.

In addition, at least one of the processing that is executed by the determining unit 124, the processing that is executed by the image processing unit 127, and the processing that is executed by the control unit 126 may also be executed such that the data amount for the first movie image and the data amount for the third movie image match.

In addition, at least one of the processing executed by the determining unit 124 or the processing executed by the image processing unit 127 may also be executed such that the data amount for the first image P1 matches the data amount for a third image.

In addition, the definition of matching in this context includes not only cases in which both are perfect matches, but also cases in which both match within a range that has been set in advance. In addition, the range that has been set in advance may be an arbitrarily set range, or it may also be set based on measurement errors for the data amounts, or the like.

In addition, although an example has been explained in the above-described embodiment for a case in which the image processing unit 121 and the image processing unit 127 are separate, the present invention is not limited thereto. That is, the image processing unit 121 and the image processing unit 127 may also be included in one unit.

In addition, although an example has been explained in the above-described embodiment for a case in which the control unit 125 and the control unit 126 are separate, the present invention is not limited thereto. That is, the control unit 125 and the control unit 126 may also be included in one unit.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the recognition apparatus through a network or various storage media. Then, a computer (or a CPU, an MPU, or the like) of the recognition apparatus may be configured to read out and execute the program. In such a case, the program and the storage medium storing the program configure the present invention.

In addition, the present invention may include, for example, at least one processor or circuit configured to function as the embodiment explained above.

This application claims the benefit of Japanese Patent Application No. 2022-166444, filed on Oct. 17, 2022, which is hereby incorporated by reference herein in its entirety.

What is claimed is:

1. A recognition apparatus comprising:
at least one processor or circuit configured to function as a plurality of units comprising:
(1) a detection unit configured to detect a subject to be recognized from a first image that has been captured by an image capturing apparatus;
(2) a determining unit configured to, in a case in which the subject has been detected from the first image, determine a region including at least a portion of the subject in the first image;
(3) a control unit configured to control the image capturing apparatus so as to generate a second image that corresponds to the region;
(4) an image processing unit configured to generate a third image by processing to increase the resolution of the second image; and
(5) a recognition unit configured to recognize contents that are indicated by the subject from the third image,
wherein the detection unit detects the subject from a plurality of the first images that forms a first movie image,
wherein in a case in which it has been determined that the subject is included in the plurality of the first images, the determining unit determines the region such that the regions become the same in the plurality of the first images, wherein the control unit controls the image capturing apparatus so as to generate a second movie image comprising a plurality of the second images, wherein the image processing unit generates a plurality of the third images by executing processing so as to increase a resolution of each of the plurality of the second images that forms the second movie image, wherein the image processing unit generates a third movie image from the plurality of the third images, wherein the control unit controls the image capturing apparatus so as to increase a number per unit of time of the plurality of the second images that forms the second movie image, and wherein the control unit controls the image capturing apparatus so as to increase the number per unit of time of the plurality of the second images that forms the second movie image according to a resolution that has been set by processing to increase the resolution of each of the plurality of the second images that forms the second movie image.

2. The recognition apparatus according to claim 1, wherein the recognition unit recognizes contents that are indicated by the subject included in the third movie image.

3. The recognition apparatus according to claim 1, wherein at least one of processing to determine the region that is executed by the determining unit, processing to generate the third movie image that is executed by the image processing unit, or processing to control the image capturing apparatus so as to increase the number per unit of time of the plurality of the second images that forms the second movie image that is executed by the control unit is executed such that a data amount for the first movie image and a data amount for the third movie image match within a range that has been set in advance.

4. The recognition apparatus according to claim 1, wherein at least one of processing to determine the region that is executed by the determining unit and processing to generate the third image that is executed by the image processing unit is executed such that a data amount for the first image and a data amount for the third image match within a range that has been determined in advance.

5. The recognition apparatus according to claim 1, wherein the image processing unit generates the third image by executing super resolution processing on the plurality of the second images.

6. The recognition apparatus according to claim 1, wherein the recognition unit recognizes at least one of written characters, numerals, symbols, or graphics that are indicated by the subject.

7. A non-transitory computer-readable storage medium configured to store a computer program comprising instructions for executing a method comprising:

detecting a subject to be recognized from a first image that has been captured by an image capturing apparatus;

in a case in which the subject has been detected from the first image, determining a region including at least a portion of the subject in the first image;

controlling the image capturing apparatus so as to generate a second image that corresponds to the region;

generating a third image by processing to increase the resolution of the second image; and recognizing contents that are indicated by the subject from the third image, wherein the detecting detects the subject from a plurality of the first images that forms a first movie image, wherein in a case in which it has been determined that the subject is included in the plurality of the first images, the determining determines the region such that the regions become the same in the plurality of the first images, wherein the controlling controls the image capturing apparatus so as to generate a second movie image comprising a plurality of the second images, wherein the generating generates a plurality of the third images by executing processing so as to increase a resolution of each of the plurality of the second images that forms the second movie image, wherein the generating generates a third movie image from the plurality of the third images, wherein the controlling controls the image capturing apparatus so as to increase a number per unit of time of the plurality of the second images that forms the second movie image, and wherein the controlling controls the image capturing apparatus so as to increase the number per unit of time of the plurality of the second images that forms the second movie image according to a resolution that has been set by processing to increase the resolution of each of the plurality of the second images that forms the second movie image.

8. A recognition method comprising:

detecting a subject to be recognized from a first image that has been captured by an image capturing apparatus;

in a case in which the subject has been detected from the first image, determining a region including at least a portion of the subject in the first image;

controlling the image capturing apparatus so as to generate a second image that corresponds to the region;

generating a third image by processing to increase the resolution of the second image; and recognizing contents that are indicated by the subject from the third image, wherein the detecting detects the subject from a plurality of the first images that forms a first movie image, wherein in a case in which it has been determined that the subject is included in the plurality of the first images, the determining determines the region such that the regions become the same in the plurality of the first images, wherein the controlling controls the image capturing apparatus so as to generate a second movie image comprising a plurality of the second images, wherein the generating generates a plurality of the third images by executing processing so as to increase a resolution of each of the plurality of the second images that forms the second movie image, wherein the generating generates a third movie image from the plurality of the third images, wherein the controlling controls the image capturing apparatus so as to increase a number per unit of time of the plurality of the second images that forms the second movie image, and wherein the controlling controls the image capturing apparatus so as to increase the number per unit of time of the plurality of the second images that forms the second movie image according to a resolution that has been set by processing to increase the resolution of each of the plurality of the second images that forms the second movie image.

9. A recognition apparatus comprising:

at least one processor or circuit configured to function as a plurality of units comprising:

(1) a detection unit configured to detect a subject to be recognized from a first image that has been captured by an image capturing apparatus;

(2) a determining unit configured to, in a case in which the subject has been detected from the first image, determine a region including at least a portion of the subject in the first image;

(3) a control unit configured to control the image capturing apparatus so as to generate a second image that corresponds to the region;

(4) an image processing unit configured to generate a third image by processing to increase the resolution of the second image; and (5) a recognition unit configured to recognize contents that are indicated by the subject from the third image, wherein the detection unit detects the subject from a plurality of the first images that forms a first movie image, wherein in a case in which it has been determined that the subject is included in the plurality of the first images, the determining unit determines the region such that the regions become the same in the plurality of the first images, wherein the control unit controls the image capturing apparatus so as to generate a second movie image comprising a plurality of the second images, wherein the image processing unit generates a plurality of the third images by executing processing so as to increase a resolution of each of the plurality of the second images that forms the second movie image, wherein the image processing unit generates a third movie image from the plurality of the third images, wherein the recognition unit recognizes contents that are indicated by the subject included in the third movie image, wherein the control unit controls the image capturing apparatus so as to increase a number per unit of time of the plurality of the second images that forms the second movie image, and wherein at least one of processing to determine the region that is executed by the determining unit, processing to generate the third movie image that is executed by the image processing unit, or processing to control the image capturing apparatus so as to increase the number per unit of time of the second images that forms the second movie image that is executed by the control unit is executed such that a data amount for the first movie image and a data amount for the third movie image match within a range that has been set in advance.

* * * * *